United States Patent [19]

Fischperer et al.

[11] Patent Number: 5,302,884
[45] Date of Patent: Apr. 12, 1994

[54] POWER SUPPLY SYSTEM AND METHOD FOR LINEAR STATOR MOTOR

[75] Inventors: Rolf Fischperer; Jan Maj, both of Erlangen, Fed. Rep. of Germany

[73] Assignee: Siemens Aktiengesellschaft, Munich, Fed. Rep. of Germany

[21] Appl. No.: 946,271

[22] Filed: Sep. 16, 1992

[30] Foreign Application Priority Data

Sep. 16, 1991 [DE] Fed. Rep. of Germany ....... 4130779

[51] Int. Cl.⁵ .................. B60L 13/00; H02P 19/00
[52] U.S. Cl. ................................ 318/135; 104/292
[58] Field of Search ............... 318/135; 310/12; 104/292

[56] References Cited

U.S. PATENT DOCUMENTS

4,955,303  9/1990  Ikeda ........................ 104/292
5,136,217  8/1992  Hoffman et al. ............ 318/135

*Primary Examiner*—Steven L. Stephan
*Assistant Examiner*—Judson H. Jones
*Attorney, Agent, or Firm*—Kenyon & Kenyon

[57] ABSTRACT

In a power supply system for a linear stator motor, the installed operating means should be utilized in an optimum manner, while the losses due to energy transfer should be maintained as low as possible. For this purpose, the cable route systems should be connected with each other by at least one controllable coupling switch, in such a way that the switching segment in which the vehicle is located at any particular time is always connected with all the cable route systems.

20 Claims, 13 Drawing Sheets

POWER SUPPLY SYSTEM AND METHOD FOR LINEAR STATOR MOTOR

BACKGROUND OF THE INVENTION

The present invention relates generally to power supply systems and methods, and more particularly to a power supply system and method for a linear stator motor.

DE-B 23 10 812 discloses a power supply system for magnetic suspension vehicles, in which the stator winding of the linear stator motor is divided into several switching segments along the travel path. The switching segments are alternately assigned to a first and a second cable route system. The switching segments and the cable route systems can be switched via switching devices (e.g. contactors) to controllable power supply devices, which are usually arranged in transformer substations. In the switching segments, a revolving field voltage $U_p$ is then induced by the vehicle in each case which supplies a thrust $F \sim U_p \times I$, where I is the input current.

This power supply system operates according to the leap frog control method. Here, a differentiation is made between a short route (or secondary) with only one transformer substation, and a long route with more than one substation along the travel path.

In the case of secondary or short routes with two cable route systems, two power supply devices (e.g. converters) are arranged in a single substation. Each converter is arranged in a cable route system. The switching segments are alternately rigidly assigned to one of the two cable route systems, and can be switched on or off via contactors. In each case, the switching segment in which the vehicle is located is switched on and supplied from one of the two converters. When changing switching segments, the converter which was previously inactive becomes active, and supplies the following switching segment.

In the case of long routes with two cable route systems, at least two converters are housed in each of the substations. The switching segment in which the vehicle is located is simultaneously supplied from two converters from adjacent substations. When changing switching segments, the other two (previously shut off) converters of the same substations are activated and supply the following switching segment.

In the previous power supply systems, one of the two converters is therefore not utilized, both for short and for long routes—aside from changes in switching segments. Furthermore, each of the cable route systems are only utilized for approximately 50% of the total operating time.

SUMMARY OF THE INVENTION

The present invention is directed to the problem of developing a power supply system and method for linear stator motors, which utilizes the installed operating means, especially the power supply devices (e.g. converters) and cable route systems, in an optimum manner, while simultaneously maintaining the losses due to the energy transfer from the power supply devices to the switching segments as low as possible.

The present invention solves this problem by coupling the cable route systems together in such a manner so that a switching segment in which the magnetic suspension vehicle is located at a specific time is always connected with the first and second cable route systems, and when changing from the first switching segment to the second switching segment both switching segments are each coupled to only one cable route system.

An advantageous embodiment of the present invention utilizes a vehicle detection device, which detects the location of the magnetic suspension vehicle. This allows proper control of the switching segments and enables control of the controllable coupling switch.

Another advantageous embodiment occurs when each cable route system has precisely one power supply device coupled to it. In this embodiment, the power supply device comprises a current converter and a feed switch arranged within a substation.

Another advantageous embodiment occurs when each cable route system utilizes several power supply devices. In this embodiment, the power supply devices comprise a converter and a feed switch, and these power supply devices are distributed among several substations. In addition, each switching segment is simultaneously supplied from at least two converters from adjacent substations.

An additional advantageous embodiment occurs when the segment switches are located in switching points, and when the coupling switches are coupled to the ends of the cable route systems. This embodiment is especially well suited for short or secondary routes because it is particularly easy to implement.

For long routes with several substations, power supply systems in which the coupling switches are coupled to the cable route systems in the substations, or between the substations, or at the switching points are particularly advantageous, since the existing cable systems are fully utilized, and redundancy is also available in case of problems.

In a power supply system in which the coupling switches are located within substations, the converters can be optionally switched to both cable route systems directly from the substation. Thus minimizing the power paths from the substation to the switching segment.

A power supply system according to the present invention results in a reduction in cable stress for the cable route systems. The converters first feed into different cable systems, so that in the case of two cable route systems, the current load is reduced by approximately 50% up to the point where the closed coupling switch brings the currents of the two cable route systems together.

In a power supply system in which the coupling switches are located at each switching point, the current paths are minimal, and the cable stress is simultaneously reduced in half.

The power supply system according to the present invention is suitable both for short or secondary routes with only one transformer substation and for long routes with more than one substation along the route. By connecting the cable route systems by means of coupling switches, the existing power supply devices (e.g. converters) are utilized in an optimum manner, since they can simultaneously supply power. With two cable route systems, both converters can simultaneously supply the switching segment in which the magnetic suspension vehicle is located at a particular time. The first converter accomplishes this directly via the first cable route system, while the second converter accomplishes this via the second cable route system, the coupling switch and the first cable route system.

As compared with the previous power supply systems operated according to the leap frog method, the present invention, in the case of two cable route systems, for example, now makes available either twice as much current and therefore twice the thrust, or enables the converters to be half the size. For long routes, rather than reducing the size of the converters half of the converters can be eliminated.

The method of the present invention operates in such a way to allow current from all power supply devices to flow to the switching segment in which the magnetic suspension vehicle is located. When the vehicle is changing from one segment to another, the current from one power supply device flows into only one switching segment and the current from another power supply device flows into the other switching segment. Finally, when the magnetic suspension vehicle moves completely within the other switching segment, the current from all power supply devices flows into the other switching segment, and none flows into the switching segment in which the vehicle was previously.

DETAILED INVENTION

In FIGS. 1-19, the stator winding of a linear motor is divided into several switching segments 1-4 along the travel path for a magnetic suspension vehicle. In the examples shown, the switching segments 1-4 are equally long, but they can also have different lengths. The switching segments 1-4 can be alternately connected to a first and a second cable route system 9 or 10, respectively, via segment switches 5-8. Two of the segment switches 5-8 are arranged in each of a switching point 24 or 25. In the examples shown in the figures, the switching segments 1 and 3 are assigned to the cable route system 9, and the switching segments 2 and 4 are assigned to the cable route system 10. For short routes (FIGS. 1 and 9-11), a single converter 11 or 12, respectively, is assigned to the first cable route system 9 and the second cable route system 10, respectively. The cable route system 9 can be connected with the converter 11 via a feed switch 13, and the second cable route system 10 can be connected to the converter 12 via a feed switch 14. The converters 11 and 12 with their related feed switches 13 and 14 are housed in a common substation 17.

For long routes (FIGS. 5 and 15-18), several converters $11a$, $11b$, or $12a$, $12b$, are assigned to each cable route system 9 or 10, respectively. In this case, the cable route system 9 can be connected with the converters $11a$ and $11b$ via feed switches 13 and 15. The cable route system 10 can be connected with the converters $12a$ and $12b$ via a feed switch 14 or 16, respectively. The converters $11a$ and $12a$ are housed together in a substation 17, and the converters $11b$ and $12b$ are housed in a substation 18, which is adjacent to the substation 17. The prior art power supply system is operated according to the leap frog control method. In this method, the switching segment in which the vehicle is located at a particular time is always switched on and supplied from one of the two converters 11 or 12. The position of the magnetic suspension vehicle is designated with x. The arrow 19 designates the direction of travel. In the case shown in FIG. 1, the vehicle is located in switching segment 1 and is moving towards switching segment 2. As long as the vehicle is located in switching segment 1, the segment switch 5 and the feed switch 13 are closed and the segment switches 6–8 and the feed switch 14 are open. Therefore the switching segment 1 is only supplied by the converter 11, and a revolving field voltage $U_{p1}$ is induced in the latter, which provides a thrust $F_1 \sim U_{p1} \times I_1$. For a better overview, the revolving field voltages and the currents as well as the thrusts are drawn in different sizes in the individual switching segments. Furthermore, the values indexed with 1 are drawn with dot-dash lines in all the diagrams, and the values indexed with 2 are shown with broken lines.

Figure 1:
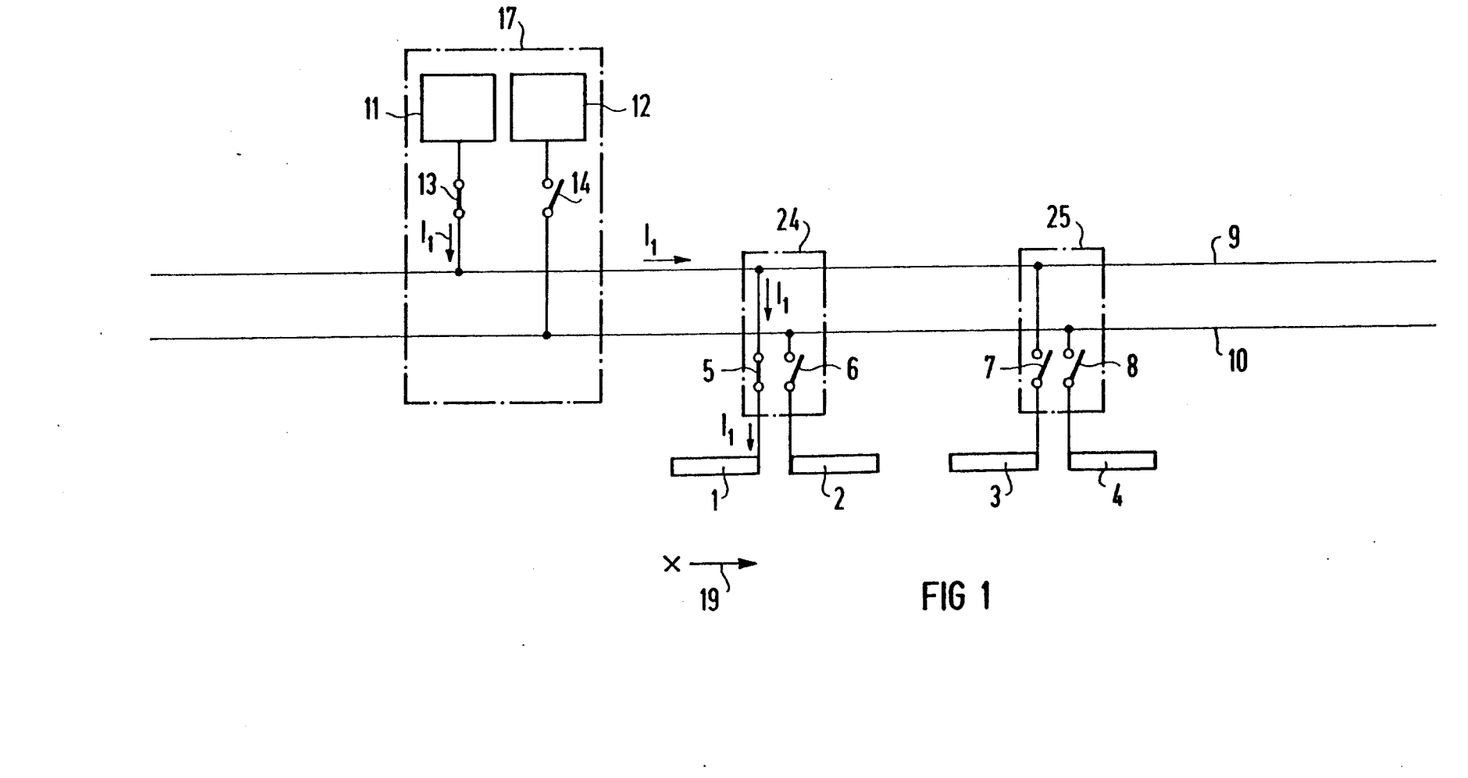
FIG. 1 depicts a power supply system for a short route.
Figure 2:
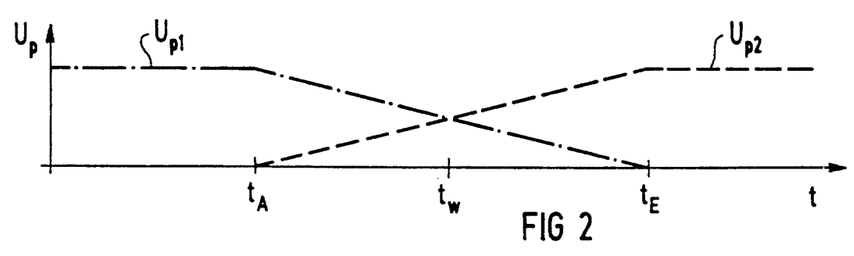
FIGS. 2 to 4, respectively, depict over time the induced revolving field voltages, the current through the switching segments and the thrust over the switching segments of a short route using a power supply system according to FIG. 1.
Figure 3:
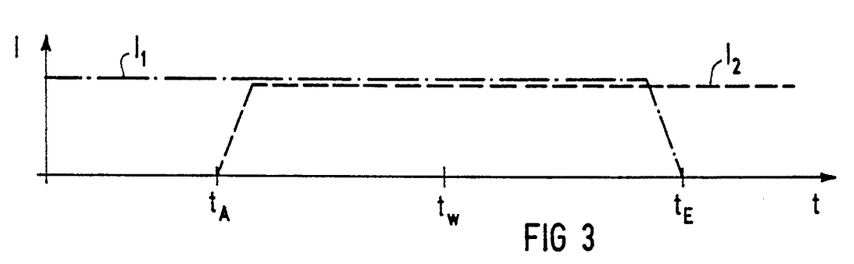
Figure 4:
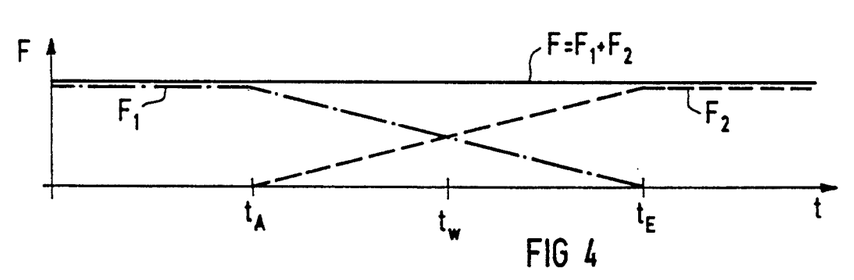
Figure 5:
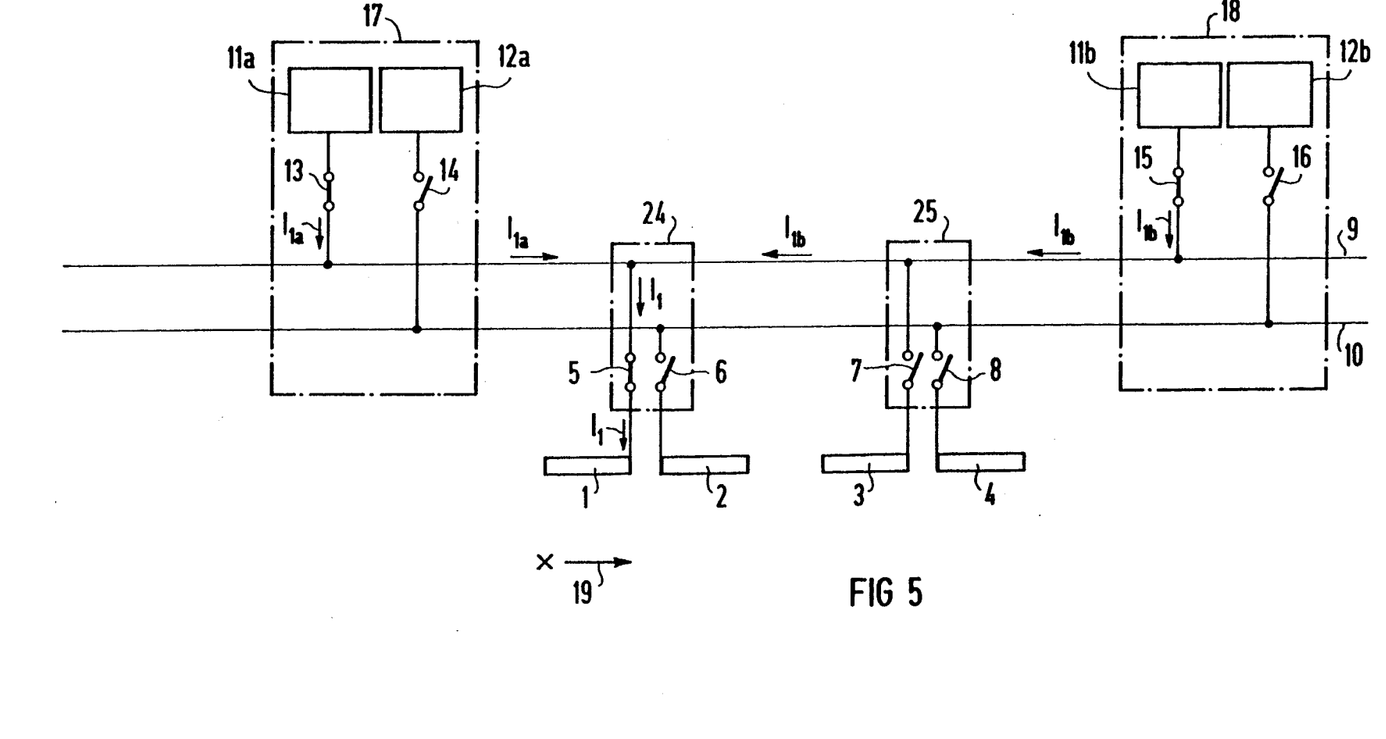
FIG. 5 depicts a power supply system for a long route.
Figure 6:
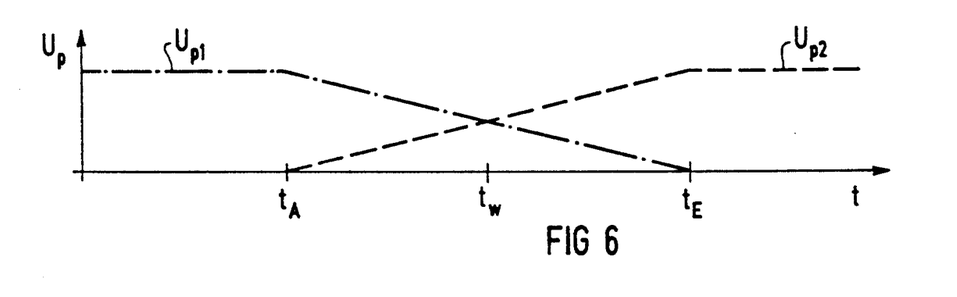
FIGS. 6 to 8, respectively, depict over time the induced revolving field voltages, the current within the segments and the thrust over the switching segments of a short route using a power supply system according to FIG. 5.
Figure 7:
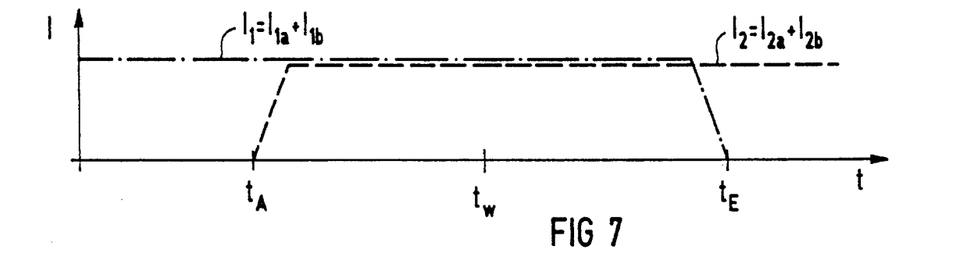
Figure 8:
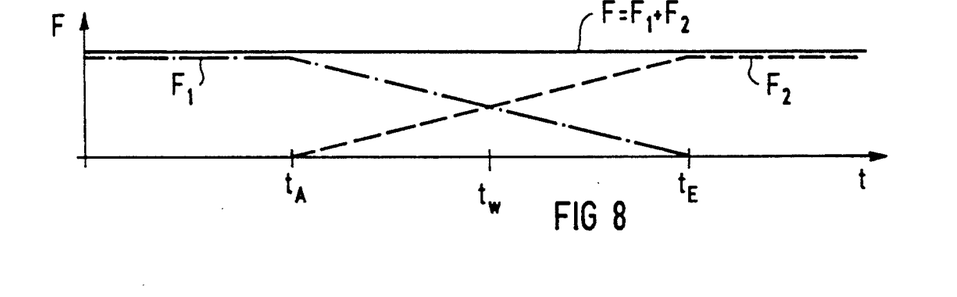
Figure 9:
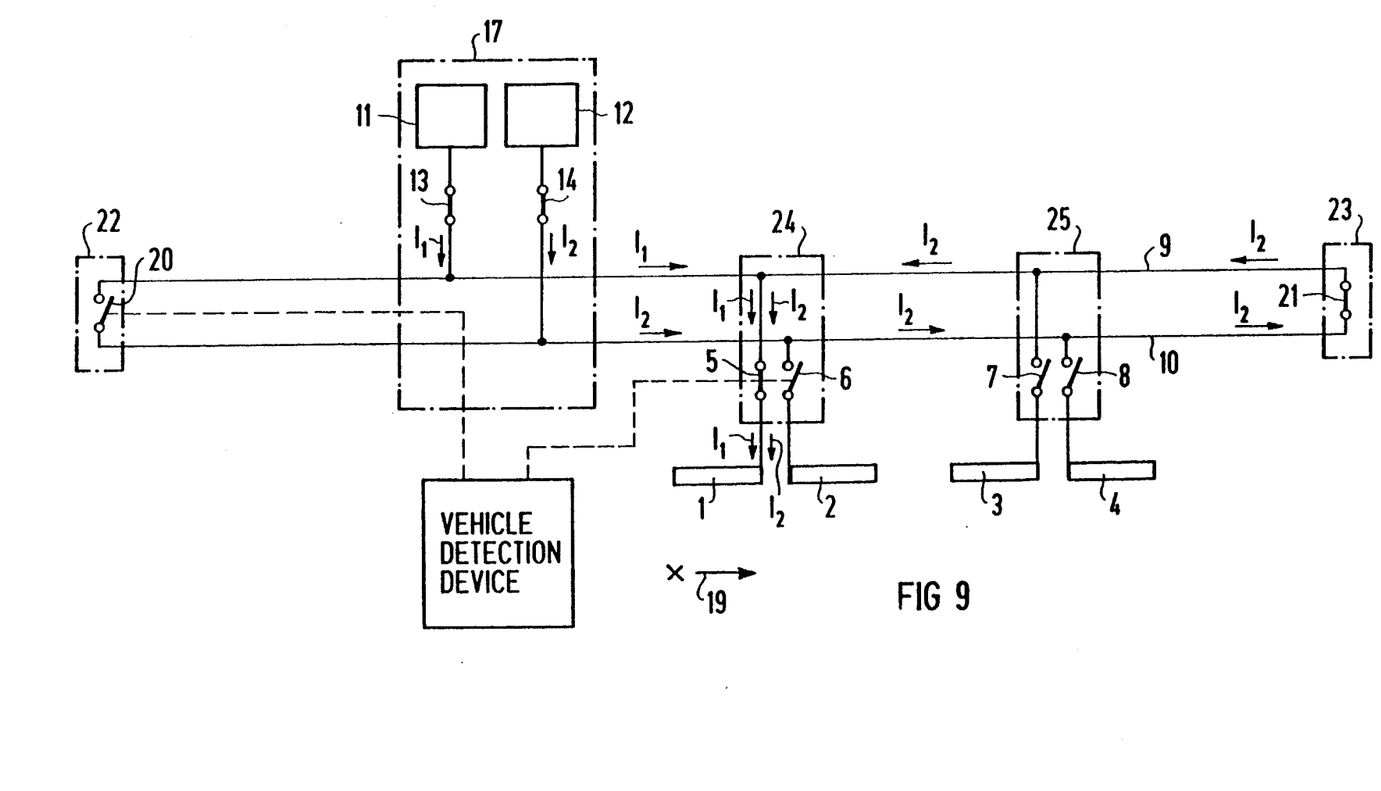
FIGS. 9 to 11 show a power supply system according to the present invention for a short route.

When changing switching segments (e.g. from switching segment 1 to switching segment 2) at the time $t_A$, the segment switch 6 and the feed switch 14 are closed, in addition, so that the switching segment 1 is supplied from the converter 11 and the switching segment 2 is supplied from the converter 12 (see FIGS. 2-4). At the times $t_w$ indicated in FIGS. 2-4, the vehicle is precisely half in switching segment 1 and half in switching segment 2. After the change in switching segments (time points $t_E$), the switches 5 and 13, which were previously closed, are opened. The converter 11 is therefore shut off. In the known control method, one of the two converters 11, 12 is not utilized—except during changes from one switching segment to another.

For the power supply system of a long route (FIG. 5), it also holds true that only the switching segment in which the vehicle is located at a particular time is supplied from its related converters. In FIG. 5, this again is the switching segment 1, which is connected with the converters $11a$ and $11b$. The segment switch 5 and the feed switches 13 and 15 are closed for this purpose, the segment switch 8 and the feed switches 14 and 16 are open. Therefore the switching segment 1 is only supplied with a current $I_1$. The current $I_1$ which flows via the segment switch 5 is the total of the currents $I_{1a}$ and $I_{1b}$ fed into the cable route system 9 by the converters $11a$ and $11b$.

When changing from switching segment 1 to switching segment 2, at the time $t_A$, the segment switch 6 and the feed switches 14 and 16 are closed, in addition, so that the switching segment 1 is supplied from the converters 11a and 11b and the switching segment 2 is supplied from the converters 12a and 12b. After the change in switching segments (time point $t_E$), the switches 5, 13 and 15, which were previously closed, are opened. The converters 11a and 11b are then shut off. Even for long routes, half of the converters are therefore not utilized, with the exception of changes from one switching segment to another (see diagrams in FIGS. 6-8). $t_w$ again indicates the time at which the vehicle is located half in each of the switching segments 1 and 2.

In the power supply system according to the present invention (FIGS. 9-11 and 15), coupling switches 20, 21 are provided, with which the cable route systems 9, 10 can be connected with each other in such a way that the switching segment in which the vehicle is located at a particular time is always connected with all the converters 11, 12, or 11a, 11b and 12a, 12b.

For short routes (FIGS. 9-11), the switching points 22, 23 present at the ends of the cable route system 9, 10 are obvious locations for the installation of coupling switches. As long as the vehicle is in the switching segment 1 (FIG. 9; time $t_1$ in FIGS. 12-14), one of the two coupling switches 20, 21 (e.g. coupling switch 21) is closed. Furthermore, the segment switch 5 and the feed switches 13 and 14 are closed, and the segment switches 6-8 are open. Therefore the switching segment 1 is connected both with the converter 11 and with the converter 12 (converter 11 directly via the first cable route system 9; converter 12 via the second cable route system 10, the coupling switch 21, the first cable route system 9 and the closed segment switch 5). The current I flowing in the switching segment 1 is therefore the total of the currents $I_1$ and $I_2$ supplied by the converters 11 and 12.

When changing from switching segment 1 to switching segment 2 (FIG. 10; time $t_3$ in FIGS. 12-14), the cable route systems 9 and 10 are separated from each other by opening of the coupling switch 21. At the same time, the segment switch 6 is closed, so that the switching segment 1 is supplied from the converter 11 (current $I_1$) and the switching segment 2 is supplied from the converter 12 (current $I_2$). $t_w$ again indicates the time at which the vehicle is located half in each of the switching segments 1 and 2.

Figure 11:
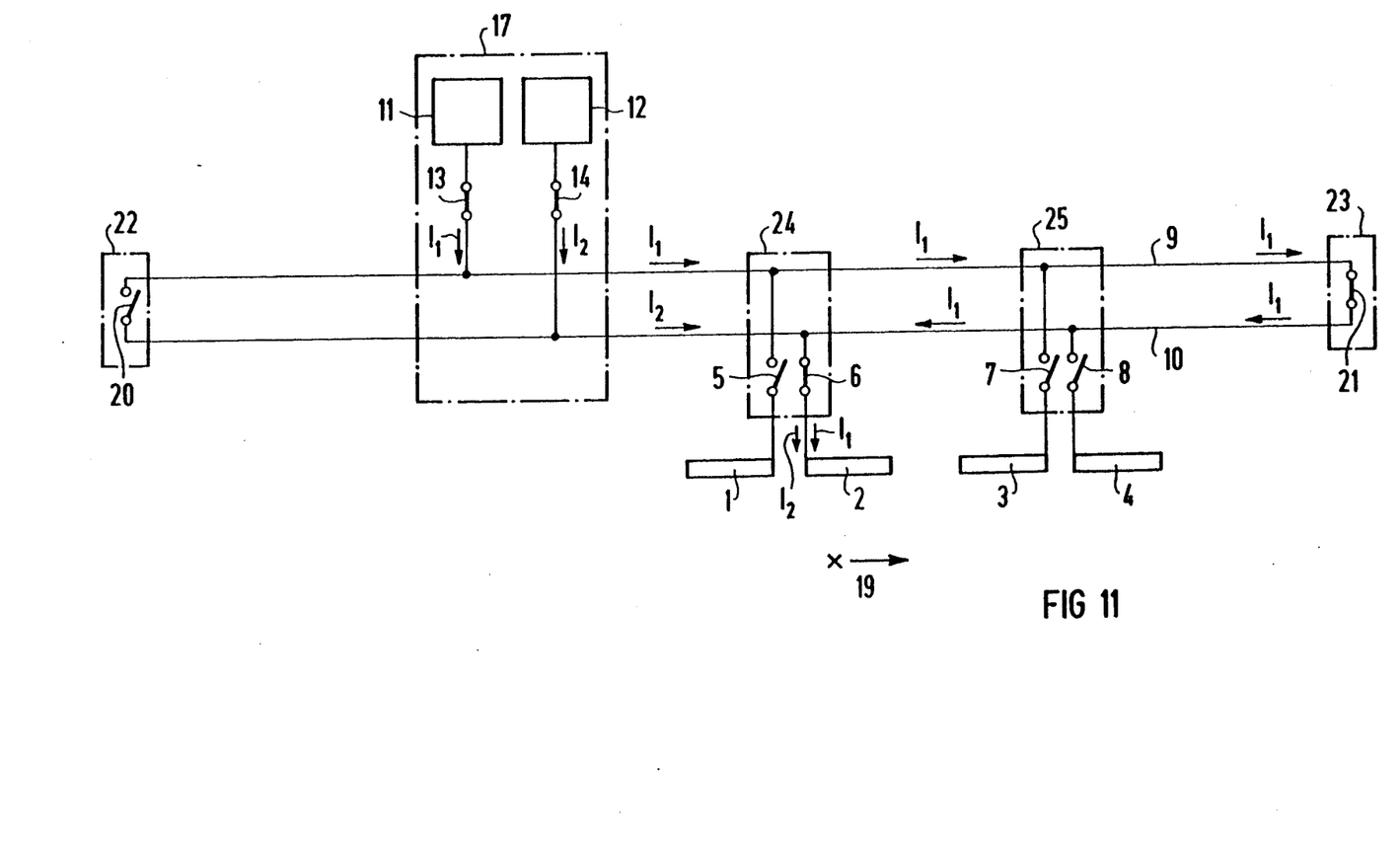
Figure 12:
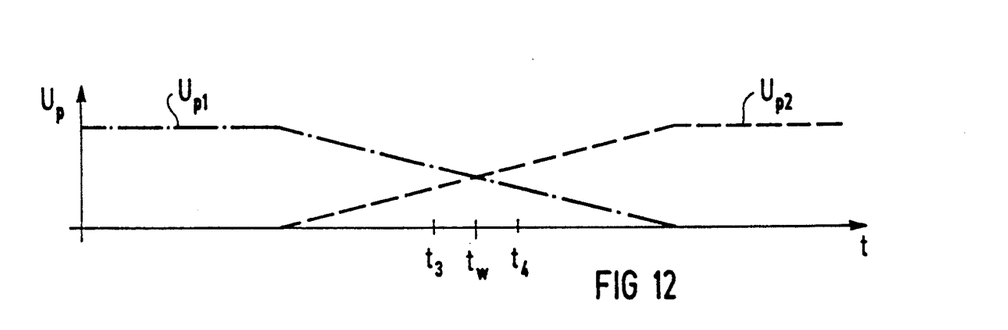
FIGS. 12 to 14, respectively, depict over time the induced revolving field voltages, the current and the thrust over the switching segments of a short route using a power supply system according to FIGS. 9 to 11.
Figure 13:
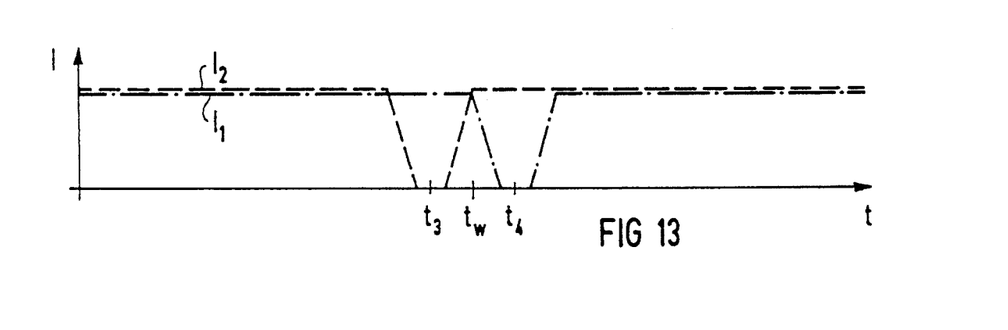
Figure 14:
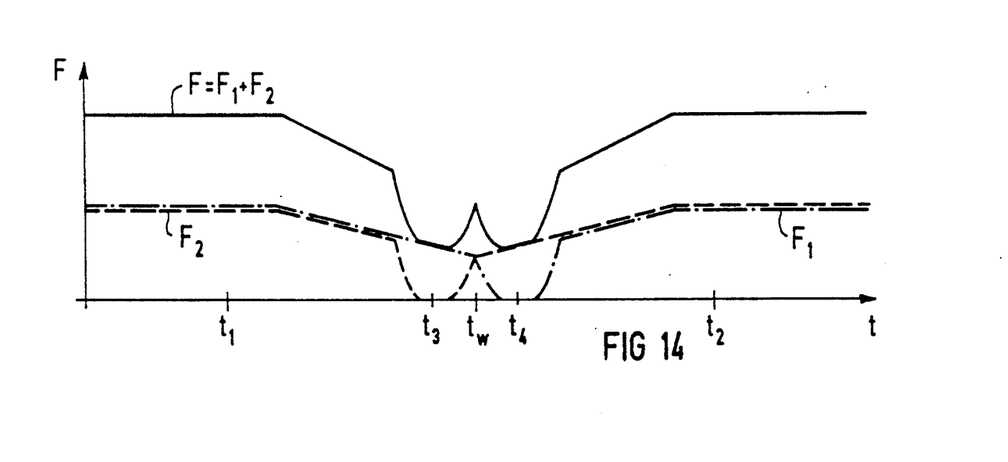

After the change in switching segments, the vehicle is located in switching segment 2 (FIG. 11; time $t_4$ in FIGS. 12-14). The segment switch 5, which was previously closed, is opened, and the coupling switches 21 is closed again. Therefore, a current I only flows in switching segment 2, which current again is the total of the currents $I_1$ and $I_2$ supplied by the converters 11 and 12.

From the schematics (FIGS. 9-11), in combination with the diagrams (FIGS. 12-14), the method of functioning of the power supply system at a change in switching segments is evident.

Figure 10:
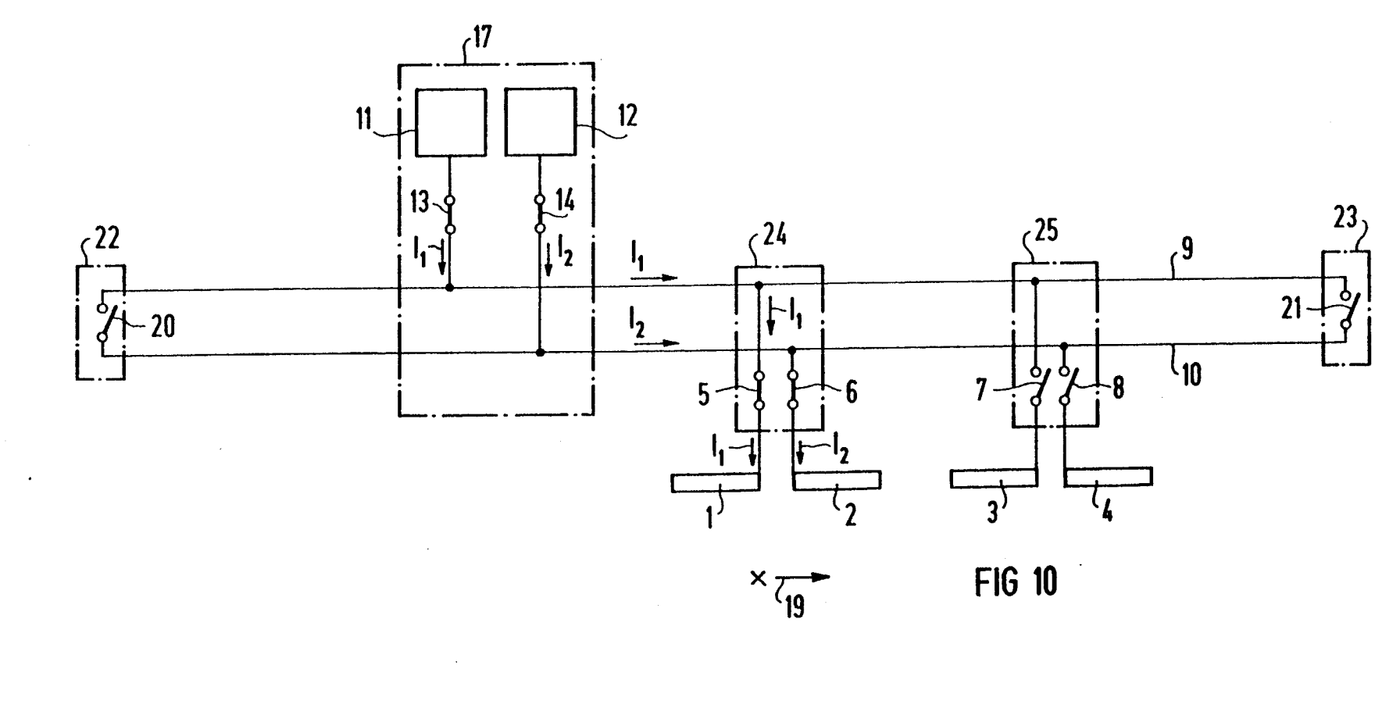

The vehicle is first located in the switching segment 1 and the converter 11 supplies this switching segment with current $I_1$. At the same time that the coupling switch 21 is opened, the converter 12 regulates the current $I_2$ to zero. Then the switching segment 2 is connected. The converter 12 regulates the current $I_2$ up again, and now supplies the switching segment 2 via the cable route system 9. While this is happening, half of the vehicle has moved into the switching segment 2 (FIG. 10). Now the converter 11 regulates the current $I_1$ to zero, the switching segment 1 is shut off and the coupling switch 21 is closed again. Then the converter 11 regulates the current $I_1$ up again and supplies the switching segment 2 via the cable route system 9, the coupling switch 21 and the cable route system 10 (FIG. 11).

Figure 15:
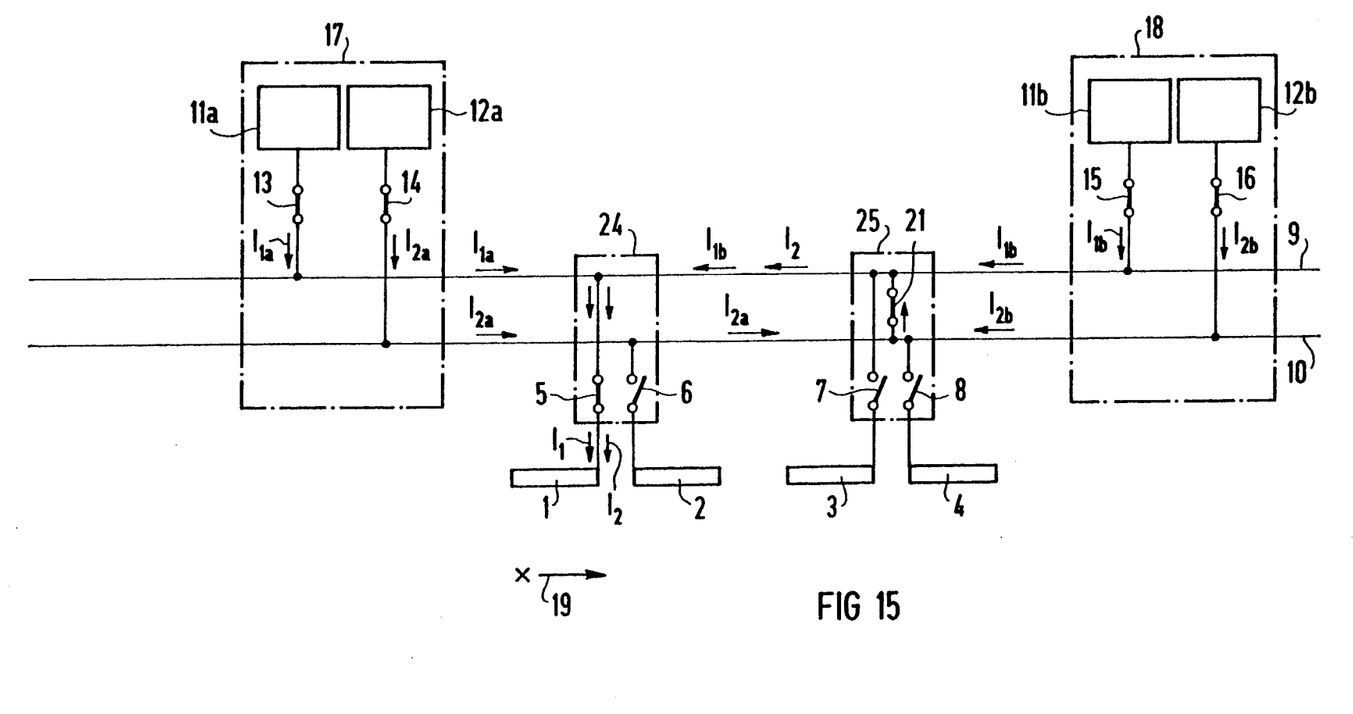
FIG. 15 shows a power supply system according to the present invention for a long route.
Figure 16:
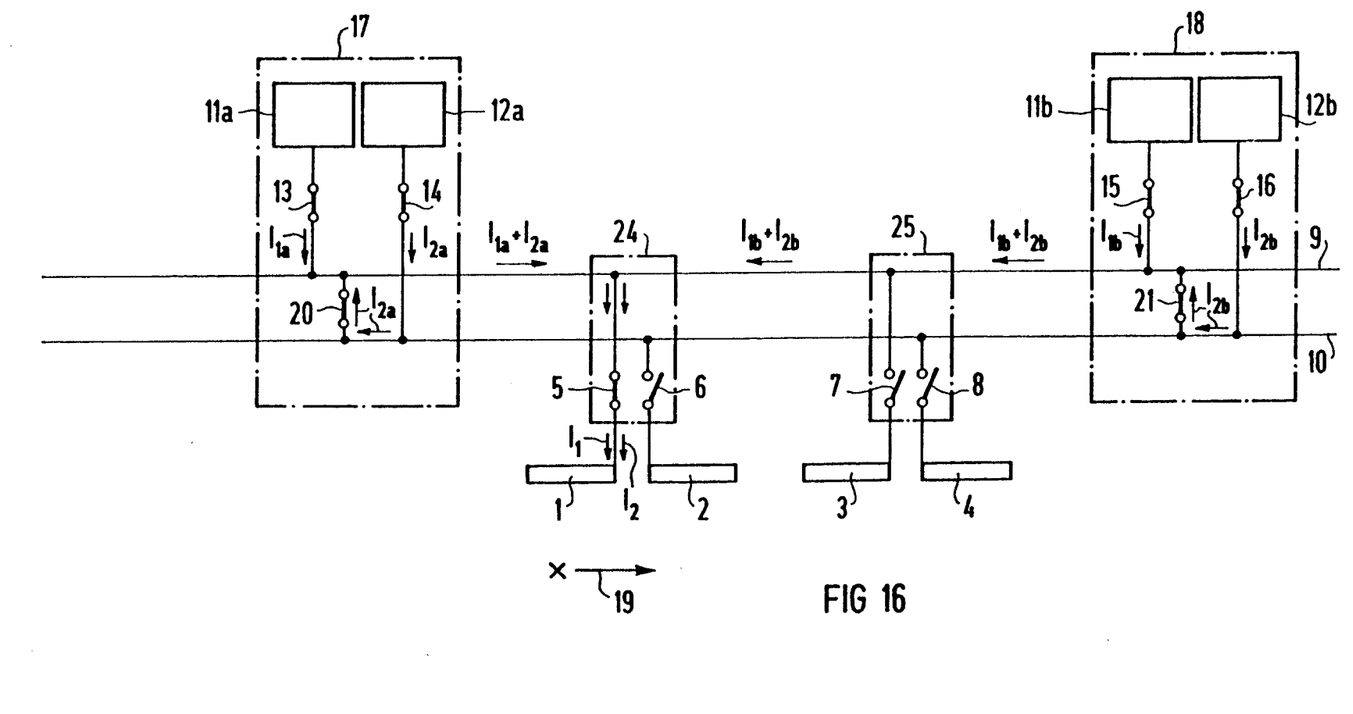
FIGS. 16 to 18 show examples of the arrangement of the coupling switch in a power supply system according to FIG. 15.
Figure 17:
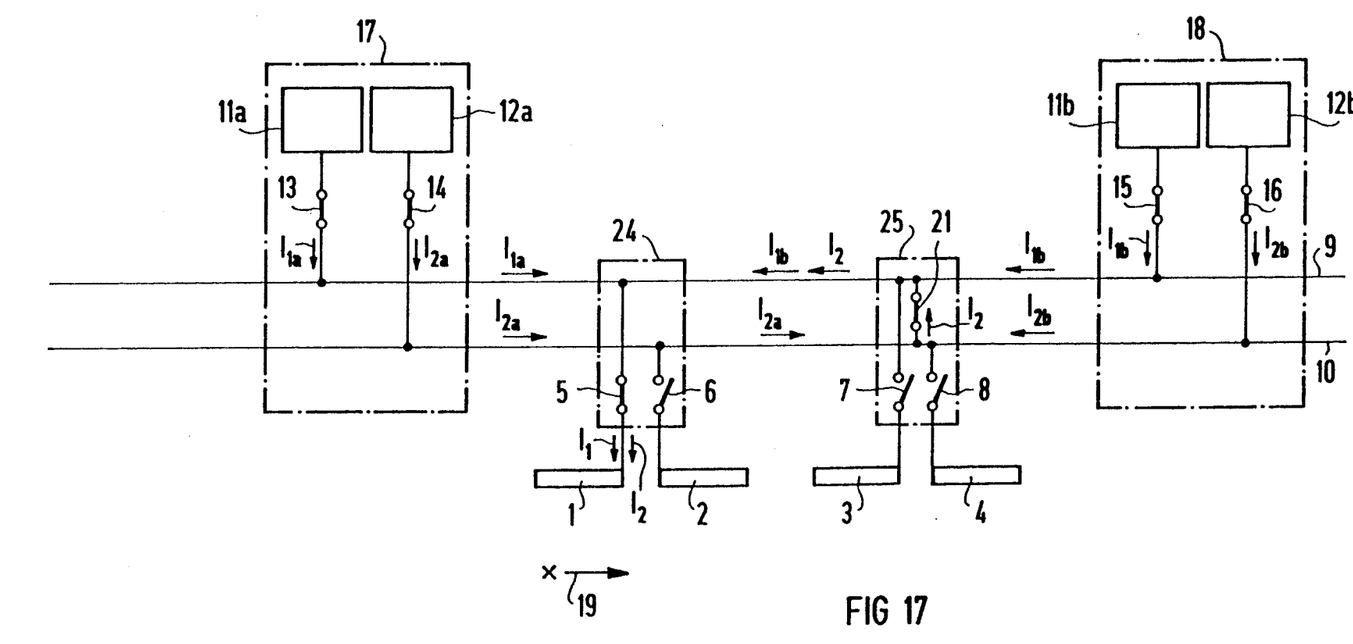
Figure 18:
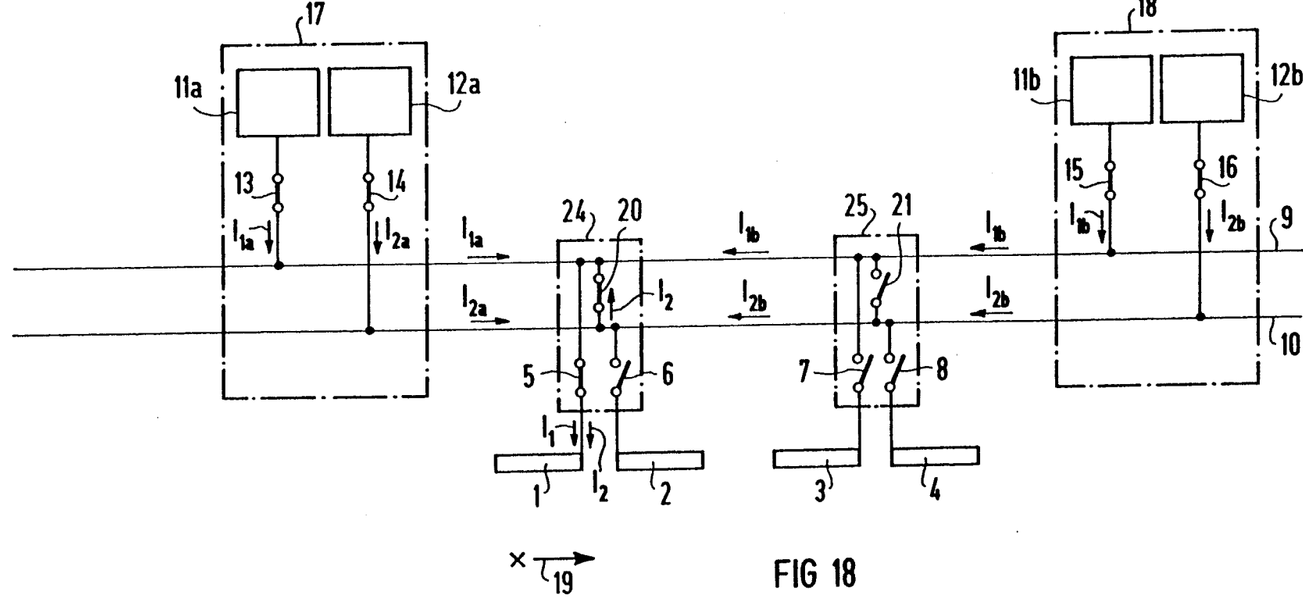

In the power supply system according to the present invention for a long route (FIGS. 15-18), the coupling switches 20, 21 can be arranged in the switching points 24, 25 of the segment switches 5 and 6 or 7 and 8, respectively; in FIG. 15, a single coupling switch 21 is arranged in the switching point 25, in FIG. 18, the coupling switch 20 is arranged in the switching point 24 and the coupling switch 21 is arranged in the switching point 25.

Control of the individual switching segments as well as regulation of the currents takes place analogous to the regulation and control for short routes.

In FIG. 15, the vehicle is located in switching segment 1. The coupling switch 21 as well as the feed switches 13 to 16 and the segment switch 5 are closed. The segment switches 6-8 are opened. Therefore the switching segment 1 is connected both with the converters 11a, 11b and with the converters 12a, 12b (converters 11a, 11b directly via the first cable route system 9; converters 12a, 12b via the second cable route system 10, the coupling switch 21 and the first cable route system 9, as well as the closed segment switch 5). The current I flowing in the switching segment 1 is therefore the total of the currents $I_1$ and $I_2$ supplied by the converters 11a, 11b as well as 12a, 12b. The currents $I_1$ and $I_2$, in turn, are the total of the currents $I_{1a}$ and $I_{1b}$, and $I_{2a}$ and $I_{2b}$, respectively.

In addition to the arrangement of the coupling switches 20, 21 in the switching points 24, 25 (FIGS. 15 and 18), the coupling switches 20, 21 can also be arranged in the substations 17 and/or 18 (FIG. 16) as well as between the substations 17, 18 (FIG. 17), as an alternative. In the examples in FIGS. 16 and 17, the vehicle again is located in the switching segments1, so that with regard to the current flow as well as the change in switching segments, reference is made to the above explanations.

Figure 19:
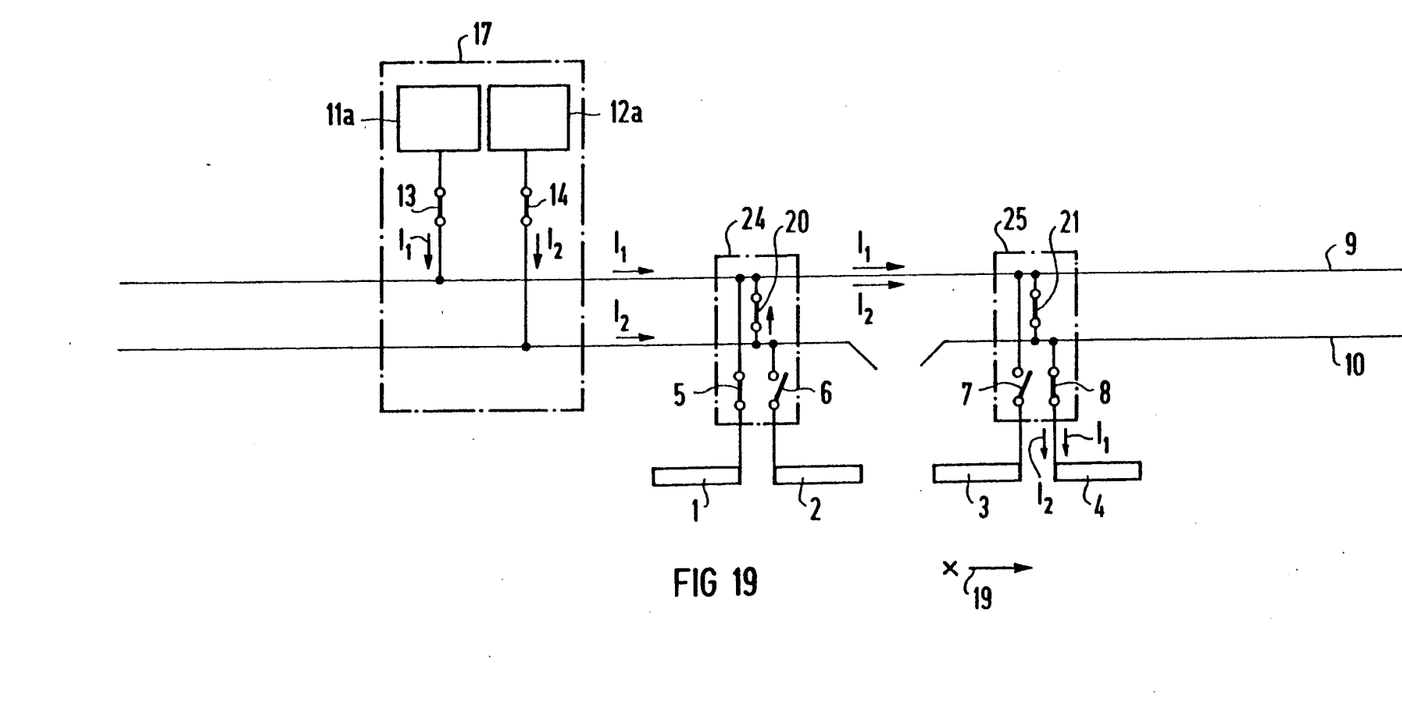
FIG. 19 shows an example for the redundance of the power supply system according to the present invention.

As shown in FIG. 19, the current can be transported to the switching segment 4 via an alternative path (first cable route system 9) in case of problems in the route switching of the power supply system according to the present invention, e.g. an interruption 26 in the cable route system 10. Therefore redundancy is achieved in an advantageous manner for when problems occur.

What is claimed is:

1. A power supply system for a linear stator motor for a magnetic suspension vehicle travelling along a travel path, which motor has a stator winding divided into a plurality of switching segments that are alternately assigned to a first and a second cable route system, said power supply system comprising:
    a) a plurality of segment switches, one interposed between each of said plurality of switching segments and its assigned cable route system;
    b) a first power supply device for the first cable route system;
    c) a second power supply device for the second cable route system;
    d) a first feed switch, said first feed switch being interposed between the first power supply device and the first cable route system;

e) a second feed switch, said second feed switch being interposed between the second power supply device and the second cable route system; and f) a first controllable coupling switch coupling the first and second cable route systems with each other, wherein by controlling said controllable coupling switch a switching segment in which the magnetic suspension vehicle is located at a specific time is always connected with the first and second cable route systems and when changing from one switching segment to another switching segment both switching segments are each coupled to only one cable route system.

2. The power supply system according to claim 1, further comprising a vehicle detection device detecting the location of the magnetic suspension vehicle and controlling the plurality of switching segments and the first controllable coupling switch.

3. The power supply system according to claim 1, further comprising a) a second power supply device;

b) a second feed switch interposed between said second power supply device and its associated cable route system, wherein the first and second cable route systems have precisely one power supply device assigned to them, and said first and second power supply devices each further comprises a current converter; and c) a single substation, wherein said first and second power supply devices as well the first and second feed switches are housed in said single substation and wherein the first and second cable route systems each have precisely one power supply device assigned to them, and said first and second power supply devices each further comprises a current converter.

4. The power supply system according to claim 2, further comprising a) a second power supply device;

b) a second feed switch interposed between said second power supply device and its associated cable route system, wherein the first and second cable route systems have precisely one power supply device assigned to them, and said first and second power supply devices each further comprises a current converter; and b) a single substation wherein said first and second power supply devices as well the first and second feed switches are housed in said single substation, and wherein the first and second cable route systems each have precisely one power supply device assigned to them, and said first and second power supply devices each further comprises a current converter.

5. The power supply system according to claim 1, further comprising a second controllable coupling switch, wherein the first and second controllable coupling switches are arranged at ends of the first and second cable route systems.

6. The power supply system according to claim 2, further comprising a second controllable coupling switch, wherein the first and second controllable coupling switches are arranged at ends of the first and second cable route systems.

7. The power supply system according to claim 3, further comprising a second controllable coupling switch, wherein the first and second controllable coupling switches are arranged at ends of the first and second cable route systems.

8. The power supply system according to claim 4, further comprising a second controllable coupling switch, wherein the first and second controllable coupling switches are arranged at ends of the first and second cable route systems.

9. The power supply system according to claim 4, wherein the first controllable coupling switch is arranged in the single substation.

10. The power supply system according to claim 5, wherein the first and second controllable coupling switch are arranged in the single substation.

11. A power supply system for a linear stator motor for a magnetic suspension vehicle travelling along a travel path, which motor has a stator winding divided into a plurality of switching segments that are alternately assigned to a first and second cable route system, said power supply system comprising:

a) a plurality of substations;

b) a plurality of segment switches switchably coupling the first and second cable route systems to the plurality of switching segments:

c) a first controllable coupling switch coupling the first and second cable route systems with each other, wherein by controlling said controllable coupling switch a switching segment in which the magnetic suspension vehicle is located at a specific time is always connected with the first and second cable route systems and when changing from one switching segment to another switching segment both switching segments involved are each coupled to only one cable route system; and d) a plurality of power supply devices being assigned to both of the first and second cable route systems, each having a related feed switch and being switchably coupled to the first and second cable route systems via the related feed switch, and being distributed among said plurality of substations together with the related feed switches, whereby the plurality of switching segments are simultaneously supplied from at least two converters from adjacent substations of the plurality of substations.

12. The power supply system according to claim 11, further comprising a plurality of switching points in which said plurality of segment switches are arranged.

13. The power supply system according to claim 11, wherein the first controllable coupling switch is arranged in one of the plurality of substations.

14. The power supply system according to claim 11, wherein the first controllable coupling switch is arranged between two of the plurality of substations.

15. The power supply system according to claim 12, further comprising a plurality of controllable coupling switches, wherein one of the plurality of controllable coupling switches is arranged in each of the plurality of switching points.

16. A method for supplying power to a linear stator motor for a magnetic suspension vehicle travelling along a travel path, which motor has a stator winding divided into at least a first and a second switching segment that are assigned to a first and second cable route system fed by first and second converters, respectively, said method comprising the steps of:

a) when the magnetic suspension vehicle is within the first switching segment:

(i) coupling the first cable route system to the first switching segment to supply a first current from the first converter to the first switching segment;

(ii) decoupling second cable route system from the second switching segment; and (iii) coupling the first and second cable route systems together via a controllable coupling switch, whereby a second current from the second converter flows into the first switching segment;

b) when the magnetic suspension vehicle is changing from the first switching segment to the second switching segment:

(i) coupling the first cable route system to the first switching segment to supply the first current from the first converter to the first switching segment;

(ii) coupling the second cable route system to the second switching segment to supply the second current from the second converter to the second switching segment; and (iii) decoupling the first and second cable route systems from each other by the controllable coupling switch, whereby the first current from the first converter flows only into the first switching segment and the second current from the second converter flows only into the second switching segment; and c) when the magnetic suspension vehicle is within the second switching segment:

(i) decoupling the first cable route system from the first switching segment;

(ii) coupling the second cable route system to the second switching segment to supply the second current from the second converter to the second switching segment; and (iii) coupling the first and second cable route systems together by the controllable coupling switch, whereby the first current from the first converter flows into the second switching segment.

17. A method for supplying power to a linear stator motor for a magnetic suspension vehicle travelling along a travel path, which motor has a stator winding divided into at least two switching segments, of which a first switching segment is assigned to a first cable route system fed by a first and a second converter, and a second switching segment is assigned to a second cable route system fed by a third and a fourth converter, said method comprising the steps of:

a) when the magnetic suspension vehicle is within the first switching segment:

(i) coupling the first cable route system to the first switching segment to supply current from the first and second converters to the first switching segment;

(ii) decoupling the second cable route system from the second switching segment; and (iii) coupling the first and second cable route systems together by a controllable coupling switch, whereby current from the third converter and fourth converters flows into the first switching segment;

b) when the magnetic suspension vehicle is changing from the first switching segment to the second switching segment:

(i) coupling the first cable route system to the first switching segment to supply current from the first and second converters to the first switching segment;

(ii) coupling the second cable route system to the second switching segment to supply current from the third and fourth converters to the second switching segment;

(iii) decoupling the first and second cable route systems from each other via the controllable coupling switch, whereby current from the first and second converters flows only into the first switching segment and current from the third and fourth converters flows only into the second switching segment; and c) when the magnetic suspension vehicle is within the second switching segment:

(i) decoupling the first cable route system from the first switching segment;

(ii) coupling the second cable route system to the second segment switch to supply current from the third and fourth converters to the second segment switch; and (iii) coupling the first and second cable route systems together via the controllable coupling switch, whereby current from the first and second converters flows into the second switching segment.

18. A method for supplying power to a linear stator motor for a magnetic suspension vehicle travelling along a travel path, which motor has a stator winding divided into at least two switching segments, of which a first and switching segment is assigned to a first cable route system fed by a first and a second converter and a second switching segment is assigned to a second cable route system fed by a third and a fourth converter, said method comprising the steps of:

a) when the magnetic suspension vehicle is within the first switching segment:

(i) coupling the first cable route system to the first switching segment to supply current from the first and second converters to the first switching segment;

(ii) decoupling the second cable route system from the second switching segment; and (iii) coupling the first and second cable route systems together by a first controllable coupling switch and decoupling the first and second cable systems from each other by a second controllable coupling switch, whereby current from the third and fourth converters flows though the second cable route system, through the first controllable coupling switch, through the first cable route system, and into the first switching segment;

b) when the magnetic suspension vehicle is changing from the first switching segment to the second switching segment:

(i) coupling the first cable route system to the first switching segment to supply current from the first and second converters to the first switching segment;

(ii) coupling the second cable route system to the second switching segment to supply current from the third and fourth converters to the second switching segment; and (iii) decoupling the first and second cable route systems from each other by the first and second controllable coupling switches, whereby current from the first and second converters flows only into the first switching segment and current from the third and fourth converters flows only into the second switching segment; and c) when the magnetic suspension vehicle is within the second switching segment:
  (i) decoupling the first cable route system from the first switching segment;
  (ii) coupling the second cable route system to the second switching segment to supply current from the third and fourth converters to the second switching segment; and
  (iii) coupling the first and second cable route systems together via the second controllable coupling switch and decoupling the first and second cable systems from each other via the first controllable coupling switch, whereby current from the first and second converters flows through the first cable route system, through the controllable coupling switch, through the second cable route system, and into the second switching segment.

19. The method according to claim 18, further comprising the step of disposing the first and second coupling switches at the ends of the first and second cable route systems.

20. A method for supplying power to a linear stator motor for a magnetic suspension vehicle travelling along a travel path, which motor has a stator winding divided into at least two switching segment, of which a first switching segment is coupled to a first cable route system fed by a first plurality of power supply devices and a second switching segment is coupled to a second cable route system fed by a second plurality of power supply devices, said method comprising the steps of:

a) when the magnetic suspension vehicle is within the first switching segment, coupling all current from all power supply devices to the first switching segment, and allowing no current to flow to the second switching segment from any of the power supply devices;

b) when the magnetic suspension vehicle is changing from the first switching segment to the second switching segment, coupling all current from the first plurality of power supply devices to the first switching segment and all current from the second plurality of power supply devices to the second switching segment; and c) when the magnetic suspension vehicle has moved completely within the second switching segment, coupling all current from all power supply devices to the second switching segment, and allowing no current to flow to the first switching segment from any of the power supply devices.

* * * * *